United States Patent [19]

Hardison

[11] 4,014,983
[45] Mar. 29, 1977

[54] REMOVAL OF HYDROGEN SULFIDE FROM GASES

[75] Inventor: Leslie C. Hardison, Barrington, Ill.

[73] Assignee: Air Revources, Inc., Palatine, Ill.

[22] Filed: Apr. 7, 1975

[21] Appl. No.: 566,042

[52] U.S. Cl. .............................................. 423/575
[51] Int. Cl.$^2$ ....................................... C01B 17/04
[58] Field of Search .......... 423/574, 575, 576, 222, 423/226, 228

[56] References Cited

UNITED STATES PATENTS 2,881,047  4/1969  Townsend ..................... 423/575 X

FOREIGN PATENTS OR APPLICATIONS

| 870,510 | 3/1942 | France | |
| 2,000,059 | 4/1971 | Germany | 423/226 |
| 1,005,096 | 9/1965 | United Kingdom | |
| 716,244 | 9/1954 | United Kingdom | |

Primary Examiner—G. O. Peters
Attorney, Agent, or Firm—Hibben, Noyes & Bicknell, Ltd.

[57] ABSTRACT

Hydrogen sulfide is removed from a gas stream by reaction with sulfur dioxide to form sulfur in the presence of an aqueous chelated iron solution as a catalyst or oxidation-reduction reagent. The reaction of hydrogen sulfide with sulfur dioxide is carried out in a first contacting zone, and the chelated iron solution is contacted with sulfur dioxide in a second contacting zone and then recycled to the first contacting zone. As applied to the treatment of a Claus process tail gas, the first contacting zone is interposed before the tail gas incinerator, and the second contacting zone is used to remove sulfur dioxide from the incinerator effluent gas.

3 Claims, 2 Drawing Figures

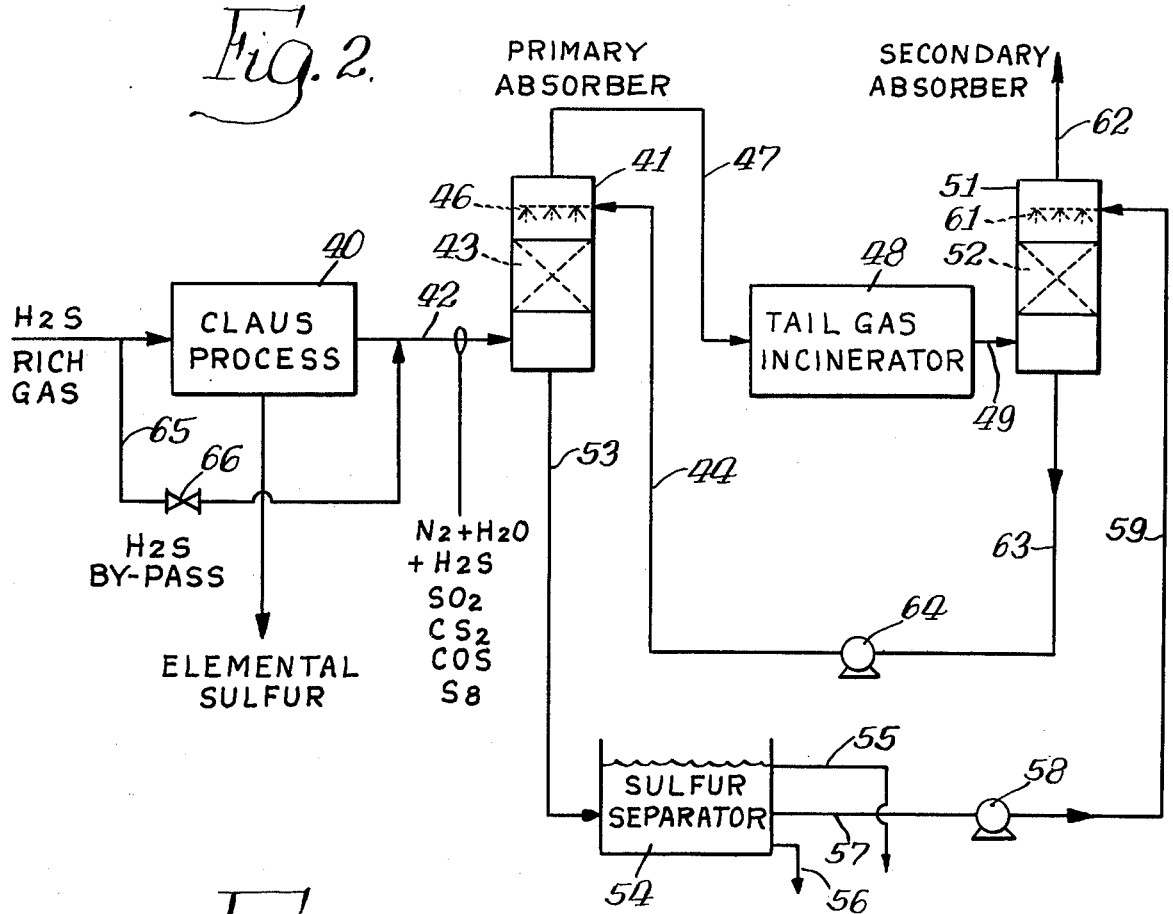
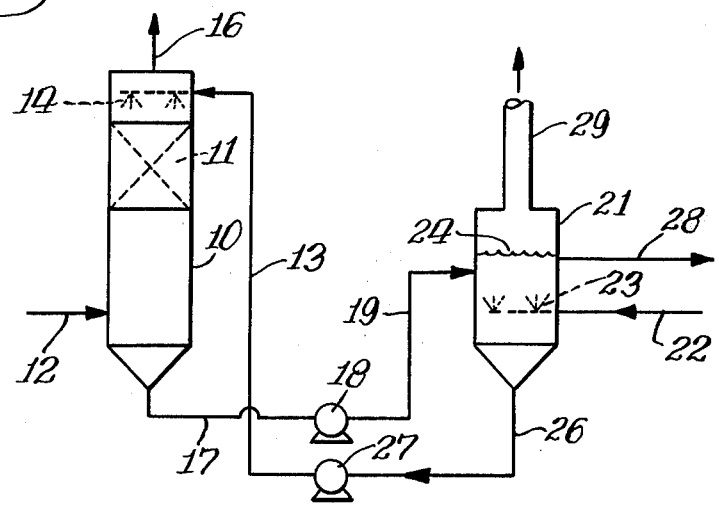

REMOVAL OF HYDROGEN SULFIDE FROM GASES

This invention relates to a novel and improved process for the removal of hydrogen sulfide from gases and the recovery of sulfur. More particularly, the invention relates to a novel process for reacting hydrogen sulfide with sulfur dioxide in the presence of an aqueous chelated iron solution as a catalyst or oxidation-reduction reagent.

Numerous processes have been suggested for the removal of hydrogen sulfide from gas streams, including (1) scrubbing with an alkaline or caustic solution, (2) incineration to form sulfur dioxide and scrubbing with an alkaline or caustic solution, (3) various dry oxidation processes using a solid catalyst or the like (e.g. the Claus process), (4) various wet oxidation processes using a basic or alkaline solution containing a suspended or dissolved catalyst or oxidizing agent, and (5) selective absorption with an amine such as monoethanolamine or diethanolamine.

It has also been suggested to effect removal of hydrogen sulfide in an oxidation-reduction system by contacting the gas stream with a solution of a polyvalent metal cation (such as iron) complexed with a chelating agent (such as ethylene diamine tetraacetic acid or a sodium salt thereof). Iron in the ferric state oxidizes the hydrogen sulfide to sulfur, the iron is reduced to the ferrous state, and the solution is regenerated by aeration to convert the iron back to the ferric state. For example, processes for removing hydrogen sulfide using a chelated iron reagent are disclosed in the following U.S. patents:

| Inventor | Patent No. | Date |
| --- | --- | --- |
| Hartley et al. | 3,068,065 | Dec. 11, 1962 |
| Pitts et al | 3,097,925 | July 16, 1963 |
| Meuly et al | 3,226,320 | Dec. 28.1965 |
| Roberts et al | 3,622,273 | Nov. 23, 1971 |
| Roberts et al | 3,676,356 | July 11, 1972 |

The use of a chelated iron solution in an oxidation-reduction system presents certain problems because of the tendency of the solution to deteriorate by precipitation of iron either as ferrous sulfide or ferric hydroxide. This inherent instability of a chelated iron solution is overcome by using two different types of chelating agents, one of which is selected to bind ferrous ions strongly enough to prevent precipitation of ferrous sulfide and the other of which is selected to bind ferric ions strongly enough to prevent precipitation of ferric hydroxide. This reagent and the process of using it are more fully described in application Ser. No. 551,279, filed Feb. 20, 1975 by Ralph B. Thompson and assigned to the same assignee as the present application, which application is incorporated herein by reference.

As described in the aforementioned prior art, chelated iron solutions are conventionally regenerated by aeration in order to return the iron in the chelate to the ferric state. However, it has been found that the usual regeneration procedure cannot be utilized when no oxygen is present in the gas stream being treated or where it is undesirable to introduce oxygen into the system, e.g. when the gas being treated contains hydrocarbons. It is known that hydrogen sulfide can be reacted with sulfur dioxide to yield elemental sulfur:

$$2H_2S + SO_2 \rightarrow 3S + 2H_2O$$

For example, in the Claus process the foregoing reaction is carried out in the presence of a solid catalyst. In Urban U.S. Pat. No. 2,987,379 and Urban et al. U.S. Pat. No. 3,023,088 the reaction of hydrogen sulfide with sulfur dioxide is carried out in a common liquid medium without the use of a catalyst. The present invention overcomes the aforementioned limitations on the regeneration of chelated iron solutions by effecting reaction of hydrogen sulfide with sulfur dioxide in the presence of a chelated iron solution as a catalyst or oxidation-reduction reagent, thereby avoiding the necessity of introducing oxygen into the system. Moreover, the chelating agent remains in solution as chelated iron and does not precipitate as in the process described in Bruen et al. U.S. Pat. No. 3,607,069. In the latter patent a ferrous iron chelate of ethylenediaminetetraacetic acid ($FE^{+2}EDTA$) is treated in a strongly acidic solvent solution (after separation from $H_2S$) with sulfur dioxide to effect formation and precipitation of ethylenediaminetetraacetic acid ($H_4EDTA$) so that the $H_4EDTA$ can again be used to form the ferrous iron EDTA chelate when the $H_4EDTA$ is subsequently added to a ferrous sulfide solution.

It is a primary object of the present invention to provide an improved process for removing hydrogen sulfide from a gas stream in the presence of sulfur dioxide.

Another object of the present invention is to provide an improved process for effecting reaction of hydrogen sulfide and sulfur dioxide to form elemental sulfur.

It is a further object of the present invention to provide an improved process for the treatment of effluent gas from a Claus process to remove hydrogen sulfide and sulfur dioxide.

Other objects of the present invention will be apparent from the following detailed description and claims when read in conjunction with the accompanying drawing, wherein:

FIG. 1 is a schematic process flow diagram showing one embodiment the present invention; and FIG. 2 is a schematic process flow diagram showing another embodiment of the invention as utilized in the treatment of a claus process tail gas.

The foregoing objects of the present invention are achieved by contacting hydrogen sulfide and sulfur dioxide with a chelated iron solution to effect conversion of both hydrogen sulfide and sulfur dioxide to elemental sulfur. It is believed that the chelated iron solution functions as a catalyst for the reaction of hydrogen sulfide with sulfur dioxide in accordance with the previously described equation. However, it is also possible that the chelated iron functions as an oxidation-reduction reagent in which complexed iron in its higher valence or ferric state is reduced to the lower valence or ferrous state and concomitant oxidation or regeneration of the reduced iron to the ferric state is effected by contacting with sulfur dioxide.

Although the present invention embraces the use of any chelated iron solution which is operable for removing hydrogen sulfide, and particularly the use of polyamino polycarboxylic acid type chelating agents, a preferred embodiment of the invention utilizes a solution containing two different types of chelating selected for their ability of complex ferrous and ferric ions, respectively. The first or Type A chelating agent preferably comprises (either singly or as a mixture) the polyamino polycarboxylic acids, the polyamino hydroxyethyl polycarboxylic acids, or the polyphosphonomethylamines, the latter being phosphorus analogs of the polyamino polycarboxylic acids. Usually the aforementioned types of chelating agents will be used in the form of their alkali metal salts, particularly the sodium salts. The polyamino polyacetic acids and the polyamino hydroxyethyl polyacetic acids, or their sodium salts, are particularly desirable. The second or Type B chelating agent, preferably comprises the sugars, the reduced sugars, or the sugar acids. Examples of suitable sugars are the disaccharides, such as sucrose, lactose, and maltose, and the monosaccharides, such as glucose and fructose. Examples of suitable sugar acids are gluconic acid and glucoheptanoic acid, and these will usually be used in the form of their alkali metal salts, particularly the sodium salts. The reduced sugars, however, are preferred for the Type B chelating agent since there is no possibility of hydrolysis or oxidation at a potential aldehyde group. Examples of suitable reduced sugars are sorbitol and mannitol.

A preferred formulation comprises a mixture of the sodium salts of ethylenediaminetetraacetic acid and N-hydroxyethylethylenediaminetriacetic acid as the Type A chelating agent and using sorbitol as the Type B chelating agent. Aqueous solutions of the aforementioned Type A chelating agents are available commercially from the Dow Chemical Co. under the trademarks "Versene 100" ($Na_4EDTA$) and "Versenol 120" ($Na_3HEDTA$). The use of this mixture of Type A chelating agents is particularly advantageous to insure the desired iron complexing effect over a very wide pH range of from about 1.5 to about 10.5.

The aforementioned chelated iron solution is preferably prepared by dissolving a suitable iron salt in water and adding the required amounts of the Type A and Type B chelating agents. To this solution an alkaline material, such as sodium carbonate or sodium hydroxide, may be added when desired to provide a concentrate which can be diluted with water to obtain an initial operating solution having the desired pH and iron content. The iron content of the solution may vary over a wide range, dependent upon the gas being treated and other factors. In general, the iron content of the chelated iron solutions used in the present invention may range from as low as about 5 to 50,000 ppm by weight or higher, but for the specific type of chelated iron solution containing the Type A and Type B chelating agents, as discussed above, the iron content is preferably from about 1000 to about 5000 ppm by weight.

For economy, the amount of chelating agent or agents used need be no greater than required to complex the amount of iron present in either valence state, and in general lesser amounts can be used.

Referring to FIG. 1, the reaction system comprises an absorption tower or scrubber 10 containing a contact zone illustrated schematically at 11. This zone may comprise any suitable liquid-vapor contacting means such as the conventional packed beds, plates or trays. An inlet gas containing hydrogen sulfide is introduced into the tower 10 through a line 12 below the contact zone 11 for passage upwardly therethrough. In particular, the inlet gas may be a gas stream containing hydrocarbons and a relatively high concentration of hydrogen sulfide, e.g. an effluent stream from a hydrocarbon conversion process or a sour natural gas containing 1-5 percent hydrogen sulfide. The chelated iron solution (containing sulfur dioxide, as hereinafter described) is supplied by a line 13 to sprays or distribution nozzles 14 located in the upper portion of the tower 10 and passes downwardly through the contact zone 11 in countercurrent relation to the upwardly flowing gas stream. The treated gas exits from the tower 10 through an outlet 16.

The used chelated iron solution containing sulfur solids is continuously withdrawn from the bottom of the tower 10 through a line 17 and is supplied by a pump 18 and a line 19 to a regeneration vessel 21. Sulfur dioxide gas is supplied through a line 22 to nozzles 23 in the lower portion of the vessel 21 below the liquid level designated at 24. The sulfur dioxide is dissolved in the solution and also reacts with any alkaline materials in the solution so that sulfur dioxide is effectively "stored" in the solution e.g. as sodium sulfite or sodium bisulfite. Thus, the used chelated iron solution is effectively regenerated and charged with sulfur dioxide in vessel 21, and the solution is then withdrawn from the vessel 21 through a line 26 and is recirculated by a pump 27 and line 13 to the tower 10. As previously described, in the tower 10 the hydrogen sulfide reacts with sulfur dioxide in the presence of the chelated iron solution as a catalyst or oxidation-reduction reagent, and the resultant sulfur solids are removed from the system as a froth or slurry through a line 28 adjacent the liquid level 24 in the vessel 21 or as a settled solid product from the bottom of vessel 21 by means not shown. The sulfur solids may be separated and recovered from the withdrawn stream by filtration or any other suitable means. The sulfur dioxide introduced through line 22 may be from any convenient source, e.g. a flue gas from combustion of sulfur-containing fuel, and residual gas exits from the vessel 21 through a conduit 29.

In the embodiment of the invention illustrated in FIG. 2 of the drawing, a hydrogen sulfide rich gas is fed to a Claus process which is designated generally at 40. The effluent or tail gas containing $H_2S$ along with small amounts of $SO_2$, COS, $CS_2$ and elemental sulfur in a nitrogen-water vapor stream is introduced continuously into a primary absorption tower 41 through a line 42 at a point below a contact zone 43 therein. The gas passes upwardly through the contact zone 43, and a chelated iron solution containing sulfur dioxide (as hereinafter described) is continuously introduced into the upper portion of the absorption tower 41 through a line 44 and sprays or distribution nozzles 46 disposed within the tower 41. The solution passes downwardly through the contact zone 43 countercurrent to the upwardly flowing gas, and the hydrogen sulfide reacts with the sulfur dioxide in the presence of the chelated iron solution acting as a catalyst or an oxidation-reduction reagent. The gas stream leaving the upper end of the absorption tower 41, which has substantially all the hydrogen sulfide dioxide removed therefrom but which still contains other sulfur-containing compounds such as $CS_2$, COS and free sulfur, is passed through a line 47 to the conventional incinerator 48 used for treating the normal tail gas from a Claus process. Here the sulfur-containing materials are oxidized to sulfur dioxide, and the $SO_2$-containing gas is passed through a line 49 into the lower portion of a secondary absorption tower 51 where it passes upwardly through a contact zone 52.

The used chelated iron solution containing sulfur solids collects in the lower portion of the primary absorption tower 41 and is continuously withdrawn through a line 53 and is discharged into a sulfur separator 54. A sulfur froth is removed by a line 55 or a settled sulfur slurry is removed through a line 56, and sulfur solids are recovered by filtering, washing and drying in any conventional manner (not shown).

The sulfur-free chelated iron solution is passed by a line 57, a pump 58, and a line 59 to the upper portion of the secondary absorption tower 51 and is discharged through distribution nozzles 61. The chelated iron solution passes downwardly through the contact zone 52 countercurrent to the upward flow of the sulfur dioxide-containing gas from the incinerator 48 and absorbs sulfur dioxide either in dissolved form or as a sulfite or bisulfite. Exit gas is removed from the tower 51 through a line 62. The chelated iron solution containing dissolved $SO_2$ or sulfite or bisulfite is withdrawn from the bottom of the secondary absorption tower 51 through a line 63 and is recirculated by a pump 64 and the line 44 to the primary absorption tower 41, as heretofore described.

Thus, in both FIGS. 1 and 2, the reaction of hydrogen sulfide with sulfur dioxide is carried out in a first contacting zone, and the used chelated iron solution is contacted with sulfur dioxide in a second contacting zone and recycled to the first contacting zone. As applied to the treatment of a Claus process tail gas, as illustrated in FIG. 2, the first contacting zone is interposed between the Claus reactors and the conventional tail gas incinerator, and the second contacting zone is used to remove sulfur dioxide from the incinerator effluent.

As will be apparent in FIG. 2, formation of sulfur by reaction between hydrogen sulfide and sulfur dioxide occurs only in the primary absorber 41, and this unit must therefore be designed to avoid or minimize plugging or fouling by deposition of sulfur solids in the contact zone 43. The secondary absorber 51 functions principally to remove sulfur dioxide from the incinerator effluent gas, although it also serves in effect to regenerate the chelated iron solution and to supply sulfur dioxide to the primary absorber 41.

As will be evident from the equation for the reaction between hydrogen sulfide and sulfur dioxide, a stoichiometric ratio of $H_2S$ to $SO_2$ of 2:1 is required for sulfur formation. Since the tail gas stream in line 42 from the Claus process may not have quite these proportions, and since all the unreacted sulfur dioxide is recovered in the secondary absorber 51 and returned to the primary absorber 41, it will be apparent that there may be an excess of $SO_2$ available in the sulfur forming zone. Accordingly, in order to maintain a proper operating balance in the primary absorber 41, a portion of the $H_2S$-rich feed gas to the Claus process 40 may be by-passed around the Claus unit when necessary through a line 65 and a control valve 66 to provide the required proportions of $H_2S$ and $SO_2$ in the gas to the primary absorber 41. Although, as previously stated, the invention broadly contemplates a pH of from about 1.5 to about 10.5 for the chelated iron solution, in the FIG. 2 embodiment it is preferred to maintain a minimum pH of about 4.5 in the solution in the primary absorber 41 to facilitate removal of $SO_2$ in the secondary absorber 51. Although the incinerator effluent from a typical Claus process may have an $SO_2$ content of 10,000 ppm or even much higher, a substantial improvement is achieved by means of the FIG. 2 embodiment described above, e.g., 300–500 ppm $SO_2$ in the effluent gas from the secondary absorber.

By way of example, a chelated iron solution suitable for use in the present invention may be prepared from a concentrate having the following composition;

|  | Grams |
| --- | --- |
| Water | 2400 |
| $FeCl_3$ (39 wt. % aqueous solution) | 577 |
| $Na_4EDTA$ | 272 |
| $Na_3HEDTA$ (41 wt. % aqueous solution) | 272 |
| Sorbitol (70 wt. % aqueous solution) | 272 |
| NaOH (50 wt. % aqueous solution) | 153 |
| $Na_2CO_3$ | 350 |

This concentrate is diluted with sufficient water to provide an operating solution having the desired iron content.

I claim:

1. In a Claus process wherein a hydrogen sulfide rich gas is treated in reactors for removal of hydrogen sulfide and the effluent tail gas from said reactors is passed through an incinerator, the improved method of treating said tail gas which comprises:
    a. contacting said tail gas, in a first contacting zone, with an aqueous chelated iron solution which has been contacted previously with sulfur dioxide, whereby to effect reaction of the hydrogen sulfide in said tail gas with sulfur dioxide;
    b. withdrawing from said first contacting zone a residual gas stream which has substantially all the hydrogen sulfide removed therefrom but which contains other sulfur-containing compounds, such as $CS_2$, COS, and free sulfur, and passing said residual gas stream through said incinerator wherein said sulfur-containing compounds are converted to sulfur dioxide;
    c. withdrawing used solution from said first contacting zone and contacting the same, in a second contacting zone, with the sulfur dioxide-containing gas stream from said incinerator, thereby removing sulfur dioxide;
    d. recycling the resultant sulfur dioxide-containing solution from said second contacting zone to said first contacting zone;
    e. discharging the treated gas from said second contacting zone; and
    f. recovering the sulfur formed by the reaction of hydrogen sulfide with sulfur dioxide in step (a).

2. The process of claim 1 further characterized in that sulfur is separated from said used solution withdrawn from said first contacting zone prior to introduction of said solution into said second contacting zone.

3. The process of claim 1 further characterized in that a regulated portion of said hydrogen sulfide rich gas is by-passed around said Claus reactors and combined with said effluent tail gas prior to introduction of the latter into said first contacting zone, whereby to provide sufficient hydrogen sulfide for reaction with the sulfur dioxide in step (a).

* * * * *